United States Patent
Büttner et al.

(10) Patent No.: US 7,104,105 B2
(45) Date of Patent: Sep. 12, 2006

(54) METHOD AND APPARATUS FOR PRODUCING A THREADED PROJECTION ON A PLATE-SHAPED WORKPIECE

(75) Inventors: Stephan Büttner, Markgröningen (DE); Thomas Muller-Hirsch, Simmozheim (DE); Michael Tanch, Leonberg (DE); Jürgen Döttling, Ditzingen (DE); Gerhard Hammann, Korntal-Münchingen (DE)

(73) Assignee: Trumpf Werkzeugmaschinen GmbH + Co. KG, Ditzingen (DE)

( * ) Notice: Subject to any disclaimer, the term of this patent is extended or adjusted under 35 U.S.C. 154(b) by 177 days.

(21) Appl. No.: 10/800,986

(22) Filed: Mar. 15, 2004

(65) Prior Publication Data

US 2004/0200257 A1    Oct. 14, 2004

(30) Foreign Application Priority Data

Mar. 15, 2003    (EP) .................................. 03005460

(51) Int. Cl.
*B21D 31/00*    (2006.01)

(52) U.S. Cl. ..................... 72/379.2; 72/335

(58) Field of Classification Search .............. 72/335, 72/379.2

See application file for complete search history.

(56) References Cited

U.S. PATENT DOCUMENTS

| 2,077,120 | A | * | 4/1937 | Lombard | .................. | 411/447 |
|---|---|---|---|---|---|---|
| 2,983,179 | A | | 5/1961 | Weinstein | | |
| 4,266,310 | A | * | 5/1981 | Perrault et al. | ............... | 470/25 |
| 5,062,289 | A | | 11/1991 | Bakermans | | |
| 5,780,805 | A | * | 7/1998 | Duncan et al. | ........ | 219/121.68 |
| 5,927,920 | A | * | 7/1999 | Swanstrom | ................. | 411/180 |
| 6,079,922 | A | * | 6/2000 | Ross et al. | ................... | 411/180 |
| 6,439,819 | B1 | * | 8/2002 | Swanstrom et al. | ........ | 411/437 |
| 6,806,441 | B1 | * | 10/2004 | Fidalgo | ................. | 219/121.72 |

FOREIGN PATENT DOCUMENTS

| DE | 20018936 | 3/2001 |
|---|---|---|
| JP | 59 191536 | 10/1984 |

* cited by examiner

*Primary Examiner*—Derris H. Banks
*Assistant Examiner*—Teresa M. Bonk
(74) *Attorney, Agent, or Firm*—Pepe & Hazard LLP

(57) ABSTRACT

A method, machine system and thread cutting device for producing a threaded projection on a plate-shaped workpiece and in particular on a sheet-metal workpiece. A workpiece lug (2) is cut with a threaded contour in the principal plane of the workpiece and at least a section of the workpiece lug (2) featuring at least one threaded contour (5, 6) is permanently bent in the form of a threaded projection extending at the desired angle relative to the principal plane of the workpiece. A machine system (9) for implementing the method encompasses a cutting device for the relief cutting of workpiece lugs (2) as well as a thread cutting device. Also included is a bending device (15) by means of which at least a section of the workpiece lug (2) provided with at least one threaded contour (5, 6) can be permanently bent relative to the principal plane of the workpiece. A thread cutting device of the machine system (9) is appropriately configured for that purpose.

17 Claims, 2 Drawing Sheets

METHOD AND APPARATUS FOR PRODUCING A THREADED PROJECTION ON A PLATE-SHAPED WORKPIECE

BACKGROUND OF THE INVENTION

This invention relates to a method for producing a threaded projection on a plate-shaped workpiece, and in particular on a sheet metal workpiece, the threaded projection extends at an angle relative to the principal plane of the workpiece, and is produced in the form of a lug, one end of which connects to and extends on at least one side from the junction with the body of the workpiece and which is provided with a threaded contour.

The invention further relates to a machine system serving to implement said method and encompassing a cutting device for the relief cutting of lugs on workpieces, a thread cutting device, and a bending device. By means of the relief cutting device for cutting lugs on the workpiece, such lugs can be cut clear so as to leave a connection at one end to the body of the workpiece. The thread cutting device can produce a thread on at least one side of the lug that extends from the remaining workpiece, and that the bending device enables at least one section of the lug can be bent at a permanent angle relative to the principal plane of the workpiece.

Finally, the invention relates to a thread cutting device within a machine system of the type referred to above.

U.S. Pat. No. 2,983,179 describes a prior art system in the general category described above. In the case of that prior art system, the first step is to produce in a sheet metal workpiece two parallel slots extending from the edge of the workpiece in the direction of the center of the workpiece. The metal tongue thus cut free is subsequently folded up. This results in a folded leg with two closely neighboring sides that extend at an angle perpendicular to the principal plane of the workpiece being processed. Finally, a corresponding die stamps a threaded contour onto the forward ends of the folded legs. The threaded contours on the mutually opposite forward ends of the folded legs constitute segments of a screw thread that will accept a threaded nut.

It is the objective of this invention to improve on this earlier methodology for producing threaded lugs and to introduce devices that permit the implementation of such procedurally improved methodology.

SUMMARY OF THE INVENTION

It has now been found that the foregoing and related objects may be readily attained in a method for producing a threaded lug projecting from a plate-shaped workpiece at an angle relative to the principal plane of the workpiece, comprising (a) cutting the workpiece to produce a generally U-shaped lug joined to the body of the workpiece along one end and with a threaded contour on at least one side of the lug extending from the junction with the body of the workpiece; and (b) bending the lug from the plane of the body of the workpiece to form a threaded projection extending at an angle relative to the principal plane of the body of the workpiece.

Generally, threaded contours are cut along both sides of the lug, and transverse cuts are produced in the workpiece at a distance from each other and along the threaded contours on the two sides are mutually offset in the longitudinal direction so as to generate a pitch. A punch press may be used to cut both the lug and threads. Alternatively, the lug and threaded contour may be generated by a laser beam.

A machining installation for producing the threaded lugs includes a cutting device for the relief cutting of a generally U-shaped lug from the workpiece, a thread cutting device for forming a threaded contour along at least one side of the lug; and a bending device for bending the lug from the plane of the body of the workpiece.

The thread cutting device can produce parallel cuts in the workpiece at a distance from each other and the threaded contours on the two sides of the lug may be offset in the longitudinal direction so as to generate a pitch. The thread cutting device may be a punch press, or a thermal cutting device such as a laser.

In the present invention, the threaded contours are produced on the lugs of the workpiece that are to serve as threaded projections while these still extend in the principal plane of the workpiece. The threaded projections are then bent up in a subsequent procedural step. This optimizes both the procedural and the equipment related aspects insofar as it eliminates any obstruction in the preceding processing steps by workpiece lugs protruding from the principal plane of the workpiece and obviates the need for hardware design changes for the purpose of assuring smooth processing unimpeded by workpiece lugs protruding from the principal plane of the workpiece.

A preferred enhancement of the invention produces in the principal plane of the workpiece, two transverse parallel cuts which are mutually spaced apart and follow a threaded contour. In this fashion, a threaded projection with two mutually opposite threaded segments can be obtained with a minimum effort in terms of time and hardware complexity. The threaded segments on both sides of the workpiece lug can in any event serve as female thread segments accepting the male threads of two different structural components. When the threaded contours on the two sides of the workpiece lug are mutually offset so as to create a pitch, and the two threaded segments combine to serve as a male thread that most effectively matches the female thread of a structural component that is to be screwed onto the threaded projection.

The key concept underlying this invention is the fact that the threaded contours of the threaded projection are produced in the principal plane of the workpiece. Conceivably, as a first step, a U-shaped lug is relief cut into the workpiece and is then provided with at least one threaded contour in a second step. In a preferred implementation of this invention, the generation of a cut along a threaded contour coincides with the partial relief cutting of the workpiece lug. In other words, relief cutting the lug on the workpiece and producing a threaded contour on at least one side of the lug extending from the junction with the workpiece is performed in one operation. This results in optimal processing time savings as well as in structural advantages in terms of the machine design.

BRIEF DESCRIPTION OF THE DRAWINGS

The following description will explain this invention in more detail with the aid of schematic illustrations in which.

DETAILED DESCRIPTION OF THE ILLUSTRATED EMBODIMENTS

Figure 1:
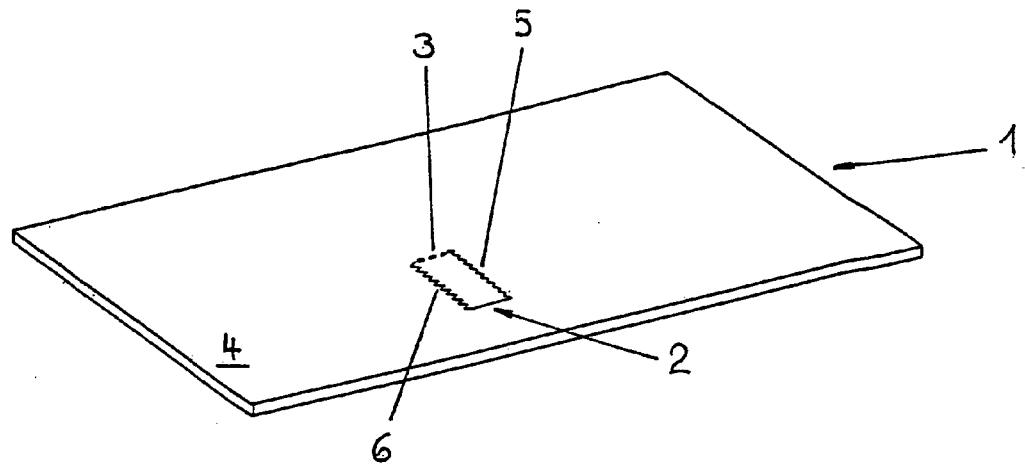
FIGS. 1 to 3 depict in diagrammatic form the progression of the method applied in producing a threaded projection on a sheet metal workpiece.

As indicated in FIG. 1, the first step in the process illustrated consists in relief cutting a workpiece lug 2 into a sheet metal workpiece 1. At this point the workpiece lug 2 still extends along the principal plane of the metal workpiece 1 and, as indicated by the dotted line in FIG. 1, connects on one end to the workpiece 4 at the lug junction 3. The workpiece lug 2 is relief cut along the longitudinal sides of the lug 2 extending from the lug junction 3 while at the same time threaded contours 5, 6 are produced. The threaded contours 5, 6 are identical, exhibiting in the example shown a conventional metric thread profile.

In the direction of the longitudinal sides of the workpiece lug 2 the threaded contours 5, 6 are mutually offset so as to result in a pitch. Imaginary tip connecting top lines of the threaded contours 5, 6 extend in mutually parallel fashion, as do imaginary intergullet cannelure connecting lines. On the far side from the lug junction 3, the workpiece lug 2 is separated from the body of the workpiece 4 by a straight cut.

Figure 2:
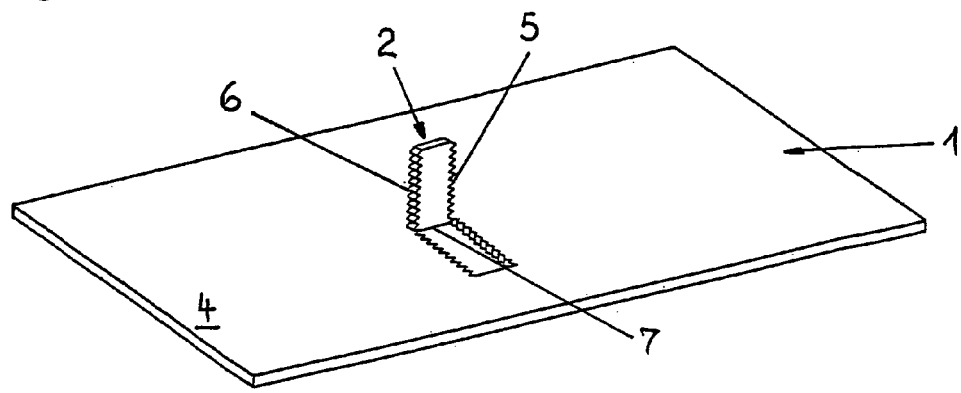

As indicated in FIG. 2, the workpiece lug 2, once relief cut and provided with the threaded contours 5, 6, is bent at a permanent angle, in this case at a right angle, relative to the principal plane of the sheet metal workpiece 1. The fold line 7 of the bend coincides with the lug junction 3 where the workpiece lug 2 meets the body of the workpiece 4. The workpiece lug 2 bent away from the principal plane of the workpiece 1 constitutes a threaded projection with a metric male thread which, combining threaded contours 5, 6, encompasses two threaded segments.

Figure 3:
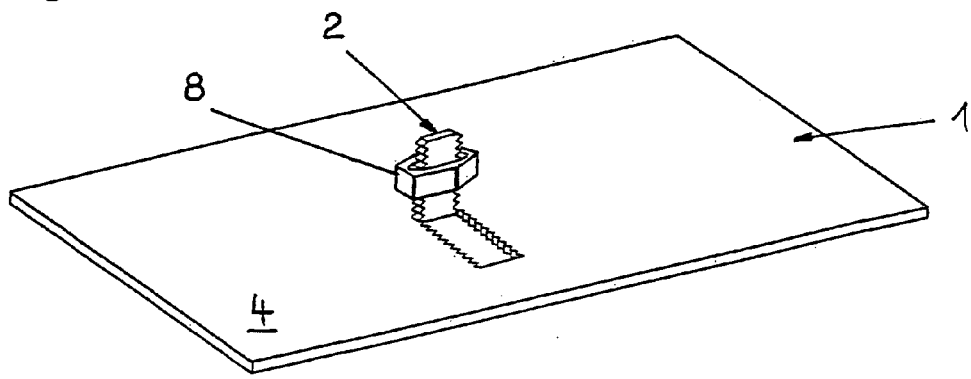

Components with a matching female thread can now be screwed onto the workpiece lug 2, i.e., the threaded projection formed by it. An example of such a component is the nut 8 shown in FIG. 3.

A machine system 9 capable of implementing the method described above is illustrated in FIG. 4, and includes a cutting station 10 as well as a bending station 11. The cutting station 10 features a conventional laser cutting device 12 mounted on a first machine frame 13. The laser cutting device 12 doubles as a relief cutting unit for workpiece lugs 2 and as a thread cutting device.

Figure 4:
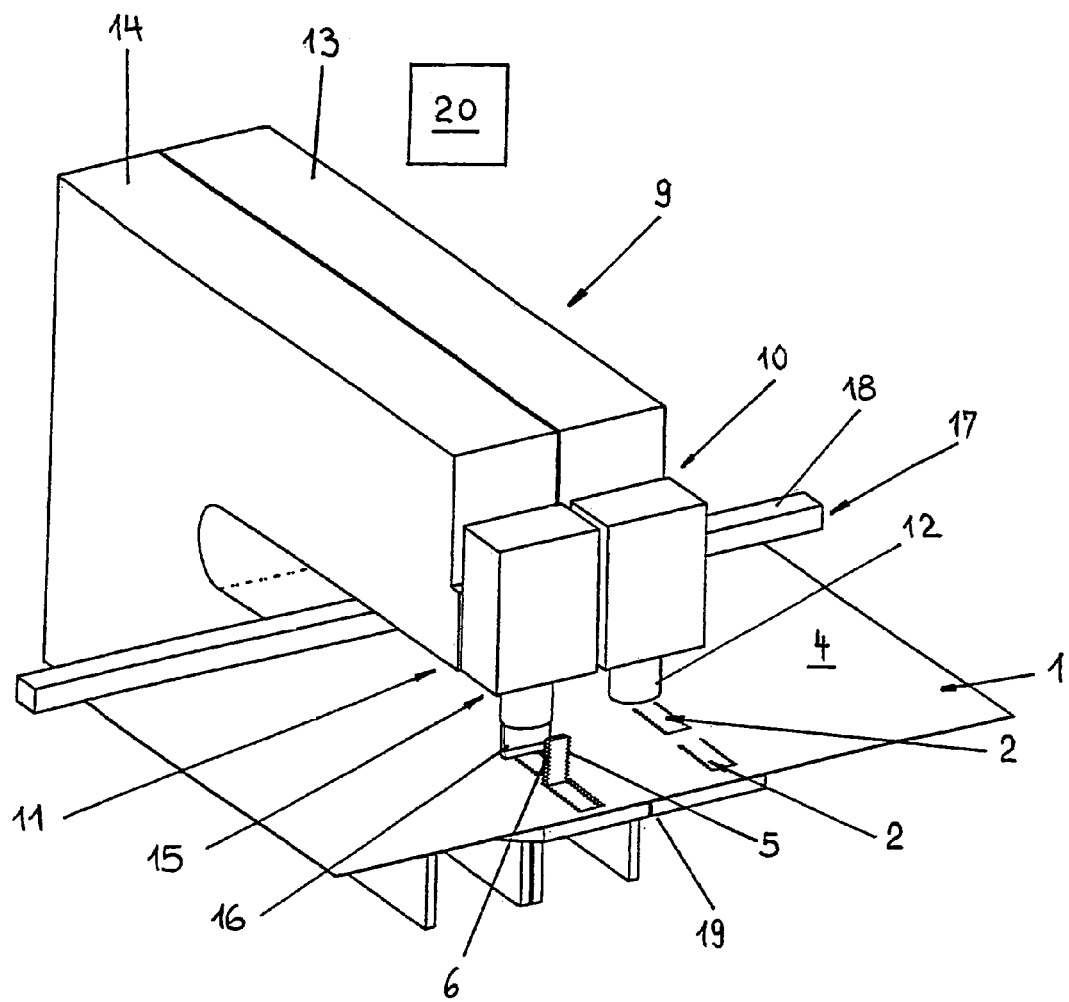
FIG. 4 shows a machining system for implementing the method illustrated in FIGS. 1 to 3.

The first machine frame 13 connects to a directly juxtapositioned second machine frame 14. The latter supports a conventional bending device 15 as part of the bending station 11. As can be seen in FIG. 4, the sheet metal workpiece 1 is held down by a workpiece holder 16 bearing down on its top surface and operating in synchronization with a bending jaw positioned underneath the workpiece 1 but obscured in FIG. 4. The workpiece holder 16 and the bending jaw are components of a bending press of a conventional design.

In lieu of two separate machine frames 13, 14, it is possible to use a single, unitary machine frame. If, in place of the laser cutting device 12, a punch press may be used for the relief cutting of workpiece lugs 2 and/or for cutting threaded contours 5, 6 into the workpiece 1, and a single processing station may suffice. In that case, the punching die and the bending tool will have to be successively interchanged in the tool holders of such a processing station. Also conceivably practicable is the use of a punch press as well as of a thermal cutting device for producing workpiece lugs 2 that are provided with at least one threaded contour 5, 6. In that case it would be possible, inter alia, in a first step using the punch press, to relief cut in the principal plane of the workpiece a lug 2 with all straight edges, whereupon in a following step the thermal cutting device produces at least one threaded contour 5, 6 on the sides of the workpiece lug 2 extending from the junction 3 with the remaining workpiece 4.

The throat of the C-shaped machine frames 13, 14 accommodates a conventional coordinate guide system 17. Clamping jaws (not illustrated) hold the workpiece 1 against a cross bar 18 of the coordinate jig 17. From underneath the workpiece 1 is supported by a platen 19 that is attached to the machine frames 13, 14. The coordinate guide system 17 allows the workpiece 1 to be moved at will in any direction along its horizontal principal plane.

For the relief cutting of the workpiece lugs 2 with simultaneous generation of threaded contours 5, 6, the coordinate guide system 17 moves the workpiece 1 relative to the stationary laser cutting device 12. That movement follows a track whereby, in the progression explained in connection with FIG. 1, the workpiece lugs 2 are separated from the body of the remaining workpiece 4 except for the lug junction 3 on one side, with mutually offset threaded contours 5, 6 along their longitudinal sides and with a straight edge on the horizontal side opposite the lug junction 3. Thereupon, the coordinate guide system 17 positions the workpiece 1, successively with all workpiece lugs 2 produced in the principal plane of the workpiece 1, opposite the bending device 15 of the bending station 11 in such fashion that activation of the bending device 15 bends the workpiece lugs 2 along a fold line that coincides with the lug junction 3 of the respective workpiece lug 2. Deviating from the conditions illustrated, it is possible to remove the serrations resulting on the body of the workpiece 4 from the generation of the threaded contours 5, 6 on the workpiece lug 2. Such straightening of the corresponding edges in the cutout of the remaining workpiece 4 can be accomplished in a separate step using the laser cutting device 12.

In FIG. 4, a workpiece lug 2 per FIG. 2 is bent at a right angle relative to the principal plane of the workpiece 1. That workpiece lug 2 is in the form of a threaded projection with a male thread which, as described in connection with FIG. 3, can serve as a threaded stud onto which another component can be threaded.

All of the functions of the machine system 9 and in particular the movement of the sheet metal workpiece 1 relative to the laser cutting device 12 and to the bending device 15 are controlled by a CNC controller 20 indicated in FIG. 4.

Having thus dedcribed the invention, what is claimed is:

1. In a method for producing on a plate-shaped workpiece having a principal plane, a threaded projection extending from the body of the workpiece at an angle relative to the principal plane of the workpiece, the steps comprising:
   (a) making cuts in a plate-shaped workpiece to produce a lug (2) with two sides and having one end joined by a junction (3) to the body of the workpiece (4) and including a cut along the course of a threaded contour (5, 6) on at least one side of the lug (2) said contour extending from said junction (3) with said body of said workpiece (4), and said lug (2) extending in the principal plane of the body of said workpiece; and
   (b) bending said lug (2) having said threaded contour (5,6) out of said plane of said body of said workpiece (4) to form a threaded projection extending at an angle relative to the principal plane of said body of said workpiece (4).

2. The method of producing a threaded projection on a workpiece in accordance with claim 1 wherein said cutting step produces two cuts along the course of threaded contours (5, 6) along both Bides of said lug (2) and extending from the junction (3) with said body of said workpiece (4).

3. The method of producing a threaded projection on a workpiece in accordance it claim 2 wherein said threaded contours (5, 6) on both sides of said lug (2) are mutually offset in the longitudinal direction so as to generate a pitch.

4. The method of producing a threaded projection on a workpiece in accordance it claim 1 wherein said cutting step is effected by a punch press to produce said at least one cut in the principal plane of said workpiece and along the course of a threaded contour (5, 6).

5. The method of producing a threaded projection on a workpiece in accordance with claim 1 wherein said cutting step utilizes a thermal cutting process to produce at least one cut in the principal plane of said workpiece along the course of a threaded contour (5, 6).

6. The method of producing a treaded projection on a workpiece in accordance with claim 5 wherein said thermal cutting process employs a laser beam.

7. The method of producing a threaded projection on a workpiece in accordance with claim 1 wherein the bending step employs a bending press.

8. The method of producing a threaded projection on a workpiece in accordance it claim 1 wherein said cutting step produces curs along the course of threaded contours on both sides of said lug.

9. A machining installation for producing on a plate-shaped workpiece a threaded projection extending from the body of the workpiece at an angle relative to the principal plane of the body of the workpiece, including:
(a) a cutting device for cutting the workpiece (4) to produce a lug (2) having two sides and joined on one end by a junction (3) to the body of the workpiece (4);
(b) a thread cutting device for producing a cut along the course of a threaded contour (5, 6) on at least one side of the lug (2) extending from the junction (3) with the body of the workpiece (4), and the lug (2) extending in the principal plane of the workpiece; and
(c) a bending device for bending the lug (2) having a threaded contour (5,6) out of the plane of the body of the workpiece (4) to form a threaded projection projecting at an angle relative to the principal plane of the body of the workpiece (4).

10. The machining installation in accordance with claim 9 wherein said thread cutting device can produce two cuts along the course of threaded contours (5, 6) on both sides of the lug (2) extending from the junction (3) with the body of the workpiece (4), while the lug (2) extends in the principal plane of the workpiece.

11. The machining installation in accordance with claim 9 wherein said thread cutting device can produce two cuts along the course of threaded contours (5, 6) on both sides of the lug (2) extending from the junction (3) with the body of the workpiece (4), said threaded contours (5, 6) on both sides of the lug (2) are offset m the longitudinal direction so to generate a pitch.

12. The machining installation in accordance with claim 9 wherein said thread cutting device is a punch press.

13. The machining installation in accordance with claim 9 wherein said thread cutting device is a thermal cutting device.

14. The machining installation in accordance with claim 13 wherein said thermal cutting device is a laser cutting device.

15. The machining installation in accordance with claim 9 wherein said bending device is a bending press.

16. The machining installation in accordance with claim 9 wherein said cutting device for the cutting of the lags (2) also serves as the thread cutting device so that the lug (2) is cut extending in the principal plane of the workpiece.

17. The machining installation in accordance with claim 9 in that the machining installation includes a cutting station, a bending station, and a workpiece coordinate guide system, and wherein said coordinate guide system transports the workpiece processed in said cutting station to said bending station.

* * * * *

UNITED STATES PATENT AND TRADEMARK OFFICE
CERTIFICATE OF CORRECTION

| | | |
|---|---|---|
| PATENT NO. | : 7,104,105 B2 | Page 1 of 1 |
| APPLICATION NO. | : 10/800986 | |
| DATED | : September 12, 2006 | |
| INVENTOR(S) | : Stefan Büttner et al. | |

It is certified that error appears in the above-identified patent and that said Letters Patent is hereby corrected as shown below:

Col. 5, line 1, "Bides" should be --sides--

Col. 5, line 25, "curs" should be --cuts--

Col. 6, line 16, "m" should be --in--

Col. 6, line 29, "lags" should be --lugs--

Signed and Sealed this

Fifth Day of December, 2006

JON W. DUDAS
*Director of the United States Patent and Trademark Office*